United States Patent
Kim et al.

(10) Patent No.: US 10,493,741 B2
(45) Date of Patent: Dec. 3, 2019

(54) APPARATUS AND METHOD FOR MANUFACTURING COMPOSITE SHEET COMPRISING AEROGEL SHEET

(71) Applicant: LG CHEM, LTD., Seoul (KR)

(72) Inventors: Ye Hon Kim, Daejeon (KR); Je Kyun Lee, Daejeon (KR); Kyoung Shil Oh, Daejeon (KR)

(73) Assignee: LG CHEM, LTD., Seoul (KR)

( * ) Notice: Subject to any disclaimer, the term of this patent is extended or adjusted under 35 U.S.C. 154(b) by 42 days.

(21) Appl. No.: 15/755,487

(22) PCT Filed: Feb. 7, 2017

(86) PCT No.: PCT/KR2017/001328
§ 371 (c)(1),
(2) Date: Feb. 26, 2018

(87) PCT Pub. No.: WO2017/142245
PCT Pub. Date: Aug. 24, 2017

(65) Prior Publication Data
US 2018/0264793 A1 Sep. 20, 2018

(30) Foreign Application Priority Data

Feb. 17, 2016 (KR) .................. 10-2016-0018643
Jul. 27, 2016 (KR) .................. 10-2016-0095255

(51) Int. Cl.
*B29C 65/00* (2006.01)
*B32B 37/12* (2006.01)
(Continued)

(52) U.S. Cl.
CPC .............. *B32B 37/12* (2013.01); *B32B 37/15* (2013.01); *C01B 33/159* (2013.01); *C08K 3/36* (2013.01);
(Continued)

(58) Field of Classification Search
CPC . B29C 65/20; B29C 65/7832; B29C 65/7841; B29C 65/7861; B29C 65/7894;
(Continued)

(56) References Cited

U.S. PATENT DOCUMENTS 4,488,929 A * 12/1984 Ostertag ................ A41D 31/02
156/553
4,783,234 A * 11/1988 Simonton ............... B29C 66/43
156/555
(Continued)

FOREIGN PATENT DOCUMENTS

CN 1592651 3/2005
CN 1839024 9/2006
(Continued)

OTHER PUBLICATIONS

Office Action of Japanese Patent Office in Appl'n No. 2018-521037 dated May 9, 2019.
(Continued)

*Primary Examiner* — Mark A Osele
*Assistant Examiner* — Nickolas R Harm
(74) *Attorney, Agent, or Firm* — Dentons US LLP

(57) ABSTRACT

The present invention relates to a method for manufacturing a composite sheet comprising an aerogel sheet, which comprises: a step (S10) of preparing a fiber sheet (10); a step (S20) of laminating the aerogel sheet (30) on each of both surfaces of the fiber sheet (10); and a step (S30) of applying heat and a pressure to the aerogel sheet (30) and the fiber sheet (10), which are laminated, to bond the sheets to each other and to manufacture the composite sheet (40) in which the aerogel sheet (30), the fiber sheet (10), the aerogel sheet (30) are laminated.

15 Claims, 8 Drawing Sheets

(51) Int. Cl.
    *B32B 37/15*     (2006.01)
    *C01B 33/159*     (2006.01)
    *C08K 3/36*     (2006.01)
    *B29C 65/78*     (2006.01)
    *B29C 65/20*     (2006.01)

(52) U.S. Cl.
    CPC .......... *B29C 65/20* (2013.01); *B29C 65/7832* (2013.01); *B29C 65/7841* (2013.01); *B29C 65/7861* (2013.01); *B29C 65/7894* (2013.01); *B29C 66/45* (2013.01); *B29C 66/721* (2013.01); *B29C 66/729* (2013.01); *B29C 66/72941* (2013.01); *B29C 66/81* (2013.01)

(58) Field of Classification Search
    CPC ..... B29C 66/45; B29C 66/721; B29C 66/729; B29C 66/72941; B29C 66/81
    USPC ....... 156/244.27, 299, 300, 303, 304.6, 324, 156/504, 543, 555, 559, 580, 583.1
    See application file for complete search history.

(56) References Cited

U.S. PATENT DOCUMENTS

| | | | |
|---|---|---|---|
| 6,989,123 | B2 | 1/2006 | Lee et al. |
| 7,078,359 | B2 | 7/2006 | Stepanian et al. |
| 7,399,439 | B2 | 7/2008 | Lee et al. |
| 7,504,346 | B2 | 3/2009 | Stepanian et al. |
| 7,780,890 | B2 | 8/2010 | Lee et al. |
| 2002/0094426 | A1 | 7/2002 | Stepanian et al. |
| 2005/0046086 | A1 | 3/2005 | Lee et al. |
| 2005/0167891 | A1 | 8/2005 | Lee et al. |
| 2006/0169404 | A1* | 8/2006 | Thebault ............... C04B 35/573 156/307.3 |
| 2006/0199455 | A1 | 9/2006 | Stepanian et al. |
| 2007/0014979 | A1* | 1/2007 | Bullock ................. B32B 5/245 428/292.1 |
| 2007/0243393 | A1 | 10/2007 | Vaidyanathan et al. |
| 2008/0093016 | A1 | 4/2008 | Lee et al. |
| 2008/0311398 | A1 | 12/2008 | Bauer et al. |
| 2009/0229032 | A1 | 9/2009 | Stepanian et al. |
| 2012/0244040 | A1 | 9/2012 | Joung et al. |
| 2013/0189521 | A1 | 7/2013 | Fukuju et al. |
| 2014/0044929 | A1 | 2/2014 | Evans et al. |
| 2014/0287641 | A1 | 9/2014 | Steiner, III |
| 2016/0258153 | A1 | 9/2016 | Koebel et al. |
| 2016/0280557 | A1 | 9/2016 | Kim et al. |
| 2017/0081495 | A1 | 3/2017 | Evans et al. |

FOREIGN PATENT DOCUMENTS

| | | |
|---|---|---|
| CN | 102826558 | 12/2012 |
| JP | 2004-517222 | 6/2004 |
| JP | 2015-068465 | 4/2015 |
| JP | 2015-524491 | 8/2015 |
| KR | 10-1999-0009158 | 2/1999 |
| KR | 10-0909732 | 7/2009 |
| KR | 10-1082982 | 11/2011 |
| KR | 10-1105436 | 1/2012 |
| KR | 10-2012-0030791 | 3/2012 |
| KR | 10-2013-0128365 | 11/2013 |
| KR | 10-2014-0050867 | 4/2014 |
| KR | 10-1506096 | 3/2015 |
| KR | 10-2015-0093122 | 8/2015 |
| WO | 2015/014813 | 2/2015 |

OTHER PUBLICATIONS

Office Action of Chinese Patent Office in Appl'n No. 201780003219.9, dated May 24, 2019.

\* cited by examiner

APPARATUS AND METHOD FOR MANUFACTURING COMPOSITE SHEET COMPRISING AEROGEL SHEET

CROSS-REFERENCE TO RELATED APPLICATION

This application is a National Stage Application of International Application No. PCT/KR2017/001328 filed on Feb. 7, 2017, which claims priority to and the benefit of Korean Patent Application Nos. 10-2016-0018643, filed on Feb. 17, 2016, and 10-2016-0095255, filed on Jul. 27, 2016, all of which are incorporated herein in their entirety by reference for all purposes as if fully set forth herein.

TECHNICAL FIELD

The present invention relates to an apparatus and method for manufacturing a composite sheet comprising an aerogel sheet, and more particularly, to an apparatus and method for manufacturing a composite sheet comprising an aerogel sheet, which has excellent thermal insulation and durability and a uniform thickness.

BACKGROUND ART

In general, an aerogel sheet is a high porous material having high porosity of about 90% to about 99% in solids that are known up to date. A silica precursor solution is subjected to sol-gel polymerization reaction to manufacture gel, and then, a drying process is performed on the manufactured gel under supercritical or atmospheric conditions to obtain the aerogel. That is, the aerogel sheet has a porous structure filled with air.

Such the aerogel sheet is lightweight and has physical properties such as heat insulation and sound absorption due to the unique porous structure in which 90% to 99% of an internal space is empty. The greatest advantage of the above-described advantages is the high heat insulation having thermal conductivity of 30 mW/m·k or less, which is significantly lower than thermal conductivity of 36 mW/m·k that is thermal conductivity of an organic insulation material such as conventional Styrofoam and the like.

DISCLOSURE OF THE INVENTION

Technical Problem

The aerogel sheet according to the related art has a limitation that has high raw material costs and manufacturing costs in spite of the excellent thermal conductivity and particularly increases in thickness due to the limitations in manufacturing method. That is, when the aerogel sheets are laminated in multiple layers, an air layer is formed due to incomplete bonding between the aerogel sheets, and thus, the thermal conductivity and durability are deteriorated.

The present invention has been made to solve the above-mentioned problems, and an object of the prevent invention is to provide an apparatus and method for manufacturing a composite sheet comprising an aerogel sheet, in which an aerogel sheet and a fiber sheet are laminated to improve bondability and durability and significantly reduce manufacturing costs.

Technical Solution

To achieve the above object, a method for manufacturing a composite sheet comprising an aerogel sheet according to a first embodiment of the present invention comprises: a step (S10) of preparing a fiber sheet (10); a step (S20) of laminating an aerogel sheet (30) on each of both surfaces of the fiber sheet (10); and a step (S30) of applying heat and a pressure to the aerogel sheet (30) and the fiber sheet (10), which are laminated, to bond the sheets to each other and to manufacture the composite sheet (40) in which the aerogel sheet (30), the fiber sheet (10), and the aerogel sheet (30) are laminated.

The method may further comprise a step (S25) of drying the aerogel sheet 30 between the step (S20) and the step (S30).

The method may further comprise a step (S26) of performing needling on the aerogel sheet (30) and the fiber sheet (10), which are laminated, to temporarily fix the aerogel sheet (30) and the fiber sheet (10) between the step (S20) and the step (S30).

The method may further comprise a step (S40) of cutting the composite sheet (40) to a predetermined size to manufacture a composite pad (50) after the step (S30).

The step (S10) comprises: a step (a) of manufacturing silica sol (2); a step (b) of manufacturing a gelling catalyst; a step (c) of injecting the silica sol (2), which is manufactured in the step (a), to a surface of a fiber sheet (1) to impregnate the silica sol (2); a step (d) of injecting the gelling catalyst (3), which is manufactured in step (b), to the surface of the fiber sheet (1), into which the silica sol (2) is impregnated, to manufacture a gel sheet (20) in which the silica sol is impregnated; a step (e) of aging the gel sheet (20) in which the silica sol is gelated; a step (f) of applying a coating solution to the aged gel sheet (20) to modify a surface of the gel sheet (20); and a step (g) of drying the gel sheet (20) of which the surface is modified to manufacture the aerogel sheet (30).

In the step (a), tetraethyl orthosilicate (TEOS) and ethanol may be mixed to manufacture the silica sol (2).

The tetraethyl orthosilicate (TEOS) may comprise hydrolyzed TEOS.

In the step (b), ethanol and ammonia water ($NH_4OH$) may be mixed to manufacture the gelling catalyst (3).

The step (c) and the step (d) may be performed within a conveyor belt that transfers the fiber sheet (1) from one side to the other side thereof.

In the step (d), the gelling catalyst (3) may be injected to the surface of the fiber sheet (1) at a rate of 0.035 L/min to 0.012 L/min to leave the gelling catalyst (3) for 8 minutes to 12 minutes and thereby to gelate the silica sol.

In the step (e), the gel sheet (20), in which the silica sol is gelated, may be aged at a temperature of 70° C. and aged for 50 minutes.

In the step (f), the coating solution may be manufactured by mixing ethanol with ammonia water ($NH_4OH$).

In the step (f), the coating solution may be injected with 1.6 times of the silica sol (2) impregnated into the surface of the fiber sheet (1), and the aging may be performed at a high temperature of 70° C. for one hour to modify the surface of the fiber sheet (10) by using hexamethyldisilazane (HMDS).

The step (g) may comprise a first drying step of injecting carbon dioxide at a rate of 70 L/min for ten minutes under environments of a temperature of 28° C. and a pressure of 70 bar to dry the gel sheet (20) of which the surface is modified, a second drying step of raising to a temperature of 50° C. for 1 hour and 20 minutes to dry the gel sheet (20), a third drying step of injecting carbon dioxide at a rate of 0.7 L/min for 20 minutes under a temperature of 50° C. and a pressure of 150 bar to dry the gel sheet (20), and a fourth drying step of injecting carbon dioxide at a rate of 0.7 L/min for 20 minutes after breaking for 20 minutes to dry the gel sheet (20).

In the third drying step of the step (g), the ethanol generated from the gel sheet (20) of which the surface is modified may be collected while injecting the carbon dioxide.

The step (g) may further comprise a step of discharging the carbon dioxide for 2 hours after the fourth drying step.

The steps (e), (f), and (g) may be performed in a reaction vessel accommodating the gel sheet.

An apparatus for performing the method for manufacturing the aerogel sheet according to the first embodiment of the present invention comprises: a gel sheet manufacturing machine (100) that manufactures a gel sheet (20); a reaction vessel (200) in which the gel sheet (20) manufactured by the gel sheet manufacturing machine (100) is aged, surface-modified, and dried to manufacture the aerogel sheet; and a composite sheet manufacturing machine (300) that bonds the aerogel sheet (30) manufactured in the reaction vessel (200) to a fiber sheet (10) to manufacture a composite sheet (40), wherein the composite sheet manufacturing machine (300) comprises a plurality of aerogel sheet supply rollers (310) supplying the aerogel sheet (30), a fiber sheet supply roller (320) supplying the fiber sheet (10) so that the fiber sheet (10) is disposed between the aerogel sheets (30), a hot press (330) pressing the aerogel sheet (30) and the fiber sheet (10) while applying heat and a pressure in the state in which the fiber sheet (10) is disposed between the aerogel sheets (30) to manufacture the composite sheet (40).

The composite sheet manufacturing machine (300) may further comprise a drying member (340) for drying the aerogel sheet (30) and the fiber sheet (10) supplied from the aerogel sheet supply roller (310) and the fiber sheet supply rollers (320) and a needling member (350) for performing needling on the aerogel sheets (30) with the fiber sheet (10) therebetween to temporarily bond the aerogel sheets (30) to the fiber sheet (10).

The gel sheet manufacturing machine (100) may comprise a winding roller (110) around which a fiber sheet (1) is wound, a conveyor belt (120) for transferring the fiber sheet (1) wound around the winding roller (110) from one side to the other side thereof, a silica sol supply member (130) for injecting the silica sol (2) to a surface of the fiber sheet (1) disposed on the conveyor belt (120) to impregnate the silica sol (2), a catalyst supply member (140) for injecting the gelling catalyst (3) to the surface of the fiber sheet (1) disposed on the conveyor belt (120) to manufacture the gel sheet (20) in which the silica sol is gelated, and a collection roller (150) for winding the gel sheet (20), which is transferred up to the other side by the conveyor belt (120), in the form of the roll to collect the gel sheet (20).

A method for manufacturing composite sheet comprising an aerogel sheet according to a second embodiment of the present invention comprises: a step (310) of preparing a fiber sheet (10); a step (S20) of laminating the aerogel sheet (30) on each of both surfaces of the fiber sheet (10) and a step (330) of applying heat and a pressure to the aerogel sheet (30) and the fiber sheet (10), which are laminated, to bond the sheets to each other and to manufacture the composite sheet (40) in which the aerogel sheet (30, the fiber sheet (10), the aerogel sheet (30) are laminated, wherein, in the step (S10) of preparing the aerogel sheet (30), the aerogel sheet (30) comprises a compound comprising an aerogel matrix and a reinforcing structure, and the aerogel matrix is continuous through the reinforcing structure, and the reinforcing structure is a lofty fibrous batting, wherein the fibers are oriented along all three axes, the lofty fibrous batting has the form of a sheet, the compound is a lightweight insulation product having resilience and durability, the lofty fibrous batting is compressible by at least 50% of its natural thickness and returns to at least 70% of its original thickness after being compressed for 5 seconds, the lofty fibrous batting has a density of 0.001 g/cm$^3$ to 0.26 g/cm$^3$, and the fibers discriminable in a cross-sectional area of the compound has a cross-sectional area less than 10% of the total cross-sectional area.

The lofty fibrous batting may be maintained to a thickness of at least 50% after the gel forming liquid is added so at to form the aerogel matrix.

The lofty fibrous batting may have resilience so that the lofty fibrous batting is compressible by at least 50% of its natural thickness and returns to at least 70% of its original thickness after being compressed for 5 seconds.

The fibers of the lofty fibrous batting, which is discriminable in the cross-sectional area of the compound, may have a cross-sectional area less than 8% of the total cross-sectional area.

Advantageous Effects

The present invention has effects as follows.

First: in the method for manufacturing the composite sheet comprising the aerogel sheet according to the present invention, the aerogel sheet and the fiber sheet may be laminated to manufacture the composite sheet, thereby improving the bondability and the durability and significantly reducing the manufacturing costs and particularly stably increasing in thickness.

Second: according to the present invention, the fiber sheet may be disposed between the plurality of aerogel sheets to increase in thickness while maintaining the elegant exterior.

Third: the present invention may use the method for manufacturing the aerogel sheet to manufacture the aerogel sheet having the superior insulation and durability, and particularly, having the uniform thickness.

Fourth: in the method for manufacturing the aerogel sheet according to the present invention, the tetraethyl orthosilicate (TEOS) and the ethanol may be mixed to obtain the silica sol having the high quality.

Fifth: in the method for manufacturing the aerogel sheet according to the present invention, the ethanol and the ammonia water ($NH_4OH$) may be mixed to obtain the gelling catalyst having the high quality.

Sixth: in the method for manufacturing the aerogel sheet according to the present invention, the conveyor belt for transferring the fiber sheet from one side to the other side thereof may be used to achieve the continuity of the operation and the simplification of the process.

MODE FOR CARRYING OUT THE INVENTION

Figure 1:
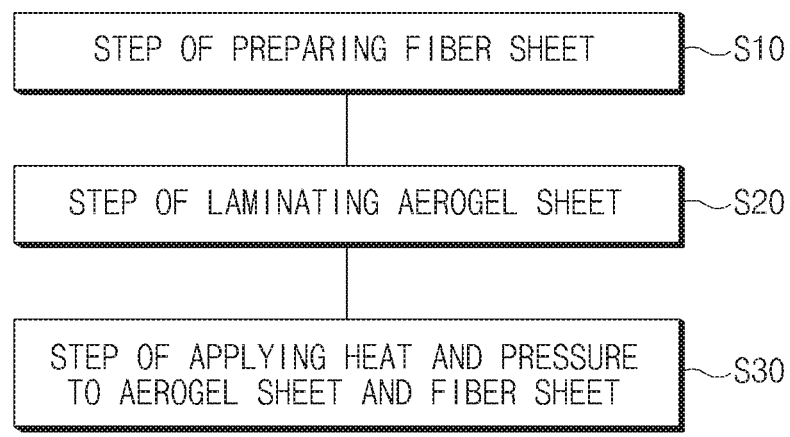
FIG. 1 is a flowchart illustrating a method for manufacturing a composite sheet comprising an aerogel sheet according to a first embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

As illustrated in FIG. 1, a method for manufacturing a composite sheet comprising an aerogel sheet according to a first embodiment of the present invention is for manufacturing a composite sheet 40 in which an aerogel sheet 30, a fiber sheet 10, the aerogel sheet 30 are laminated and comprises a fiber sheet preparing step (S10), an aerogel sheet laminating step (S20), and a composite sheet manufacturing step (S30).

[Fiber Sheet Preparing Step]

Figure 7:
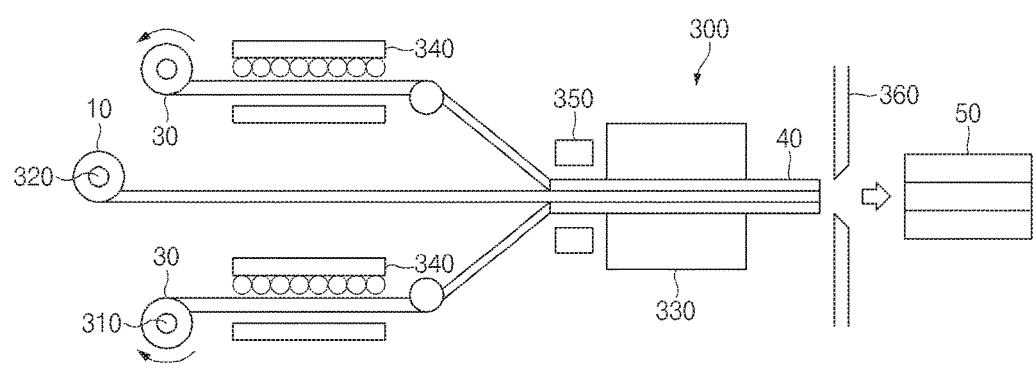
FIG. 7 is a view illustrating an apparatus for manufacturing a composite sheet comprising the aerogel sheet according to the first embodiment of the present invention.

As illustrated in FIG. 7, the fiber sheet preparing step (S10) is for increasing a thickness and improving bondability of the aerogel sheet when the composite sheet is manufactured. Here, the fiber sheet 10 such as a blanket is prepared. Also, the prepared fiber sheet 10 is mounted on a fiber sheet supply roller 320 to allow the fiber sheet supply roller 320 to supply the fiber sheet 10.

[Aerogel Sheet Laminating Step]

In the aerogel sheet laminating step (S20), the aerogel sheet 30 is laminated on each of both surfaces of the fiber sheet 10 after the aerogel sheet 30 is manufactured. Here, the aerogel sheet 30 has thermal insulation and durability and particularly has a uniform thickness.

Figure 2:
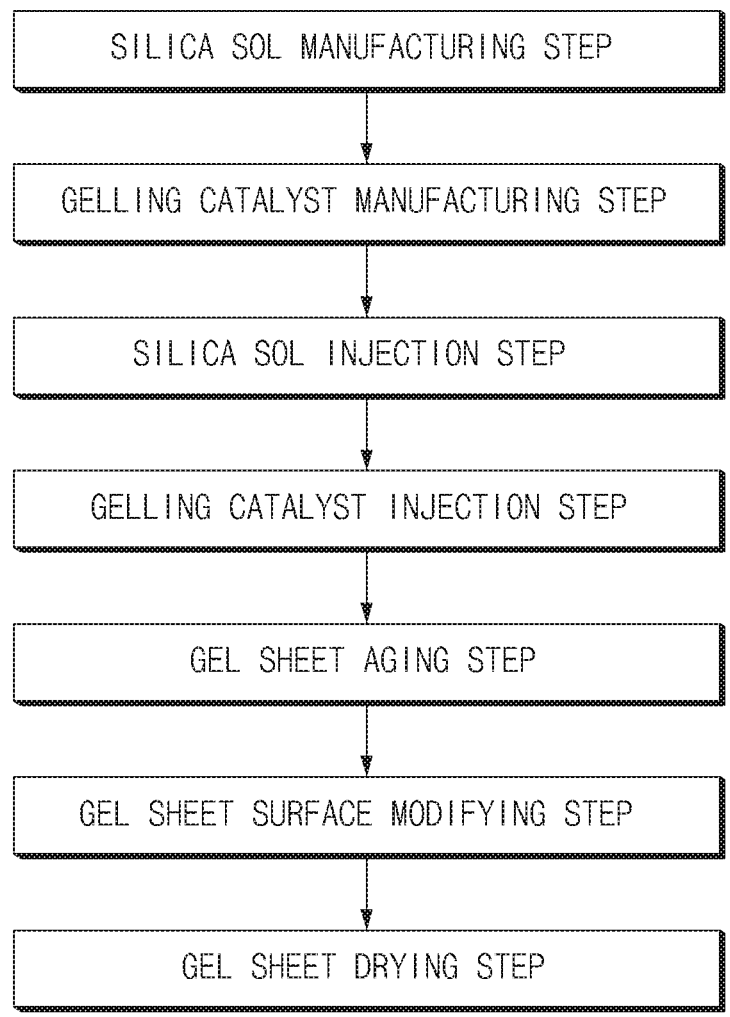
FIG. 2 is a flowchart illustrating a method for manufacturing the aerogel sheet according to the first embodiment of the present invention.
Figure 3:
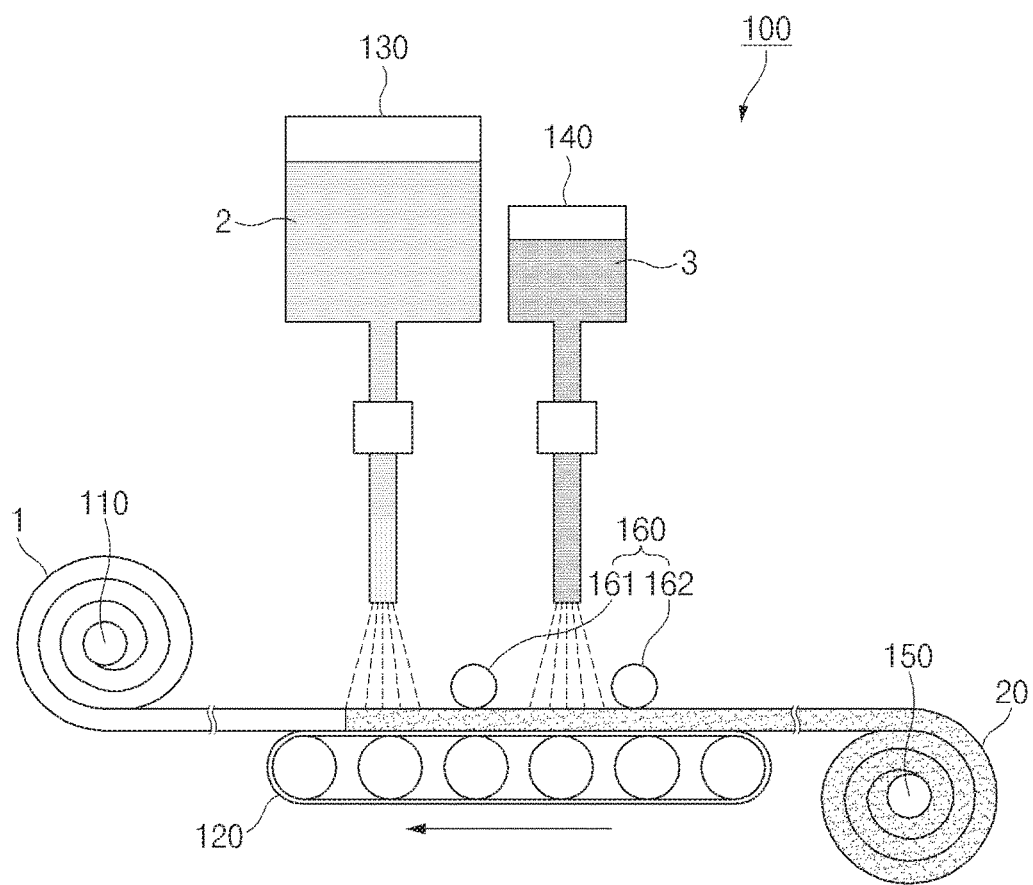
FIG. 3 is a view illustrating an apparatus for manufacturing the aerogel sheet according to the first embodiment of the present invention.

That is, as illustrated in FIG. 2, the method for manufacturing the aerogel sheet is for manufacturing an aerogel sheet having superior thermal insulation and durability and having a uniform thickness and comprises a step (a) of manufacturing silica sol 2, a step (b) of manufacturing a gelling catalyst 3, a step (c) of injecting the silica sol 2 manufactured in the step (a) to a surface of the fiber sheet 1 to impregnate the silica sol 2, a step (d) of injecting the gelling catalyst 3 manufactured in the step (c) to the surface of the fiber sheet 1, into which the silica sol is impregnated, to manufacture a gel sheet 20 in which the silica sol is gelated, a step (e) of aging the gel sheet 20 in which the silica sol is gelated, a step (f) of applying a coating solution to the aged gel sheet 20 to modify a surface of the gel sheet 20, and a step (g) of drying the gel sheet 20 of which the surface is modified to manufacture the aerogel sheet 30.

Hereinafter, the aerogel sheet preparing step (S10) will be described in more detail.

(a) Silica Sol Manufacturing Step

The silica sol manufacturing step (a) is a step of obtaining the silica sol. Here, tetraethyl orthosilicate (TEOS) and ethanol are mixed to manufacture the silica sol 2. That is, 1.2 kg of TEOS and 2.7 kg of ethanol are provided in a reaction bath (not shown) to manufacture the silica sol 2.

The TEOS may use a solvent having high reactivity with water and be hydrolyzed to more improve reactivity. That is, the hydrolyzed TEOS and the ethanol may be mixed to obtain the silica sol 2 having excellent reactivity.

(b) Gelling Catalyst Manufacturing Step

The gelling catalyst manufacturing step (b) is a step of obtaining the gelling catalyst. Here, ethanol and ammonia water ($NH_4OH$) are mixed to manufacture the gelling catalyst 3. That is, 0.5 kg of ethanol and 30 ml of ammonia water ($NH_4OH$) are mixed in the reaction bath (not shown) to manufacture the gelling catalyst 3.

An apparatus for manufacturing the composite sheet according to the first embodiment of the present invention comprises a gel sheet manufacturing machine 100 that manufactures the gel sheet 20, a reaction vessel 200 in which the aerogel sheet is manufactured by using the gel sheet 20, and a composite sheet manufacturing machine that manufactures a composite sheet 40 by using the aerogel sheet 30.

Gel Sheet Manufacturing Machine

Here, the silica sol injection step (c) and the gelling catalyst injection step (d) are performed in the gel sheet manufacturing machine 100. The gel sheet manufacturing machine 100 will be described below in detail.

That is, as illustrated in FIG. 2, the gel sheet manufacturing machine 100 comprises a winding roller 110 around which the fiber sheet 1 is wound in the form of a roll, a conveyor belt 120 for transferring the fiber sheet 1 wound around the winding roller 110 from one side to the other side thereof, a silica sol supply member 130 for injecting the silica sol 2 manufactured in the step (a) to a surface of the fiber sheet 1 disposed on the conveyor belt 120 to impregnate the silica sol 2, a catalyst supply member 140 for injecting the gelling catalyst 3 manufactured in the step (b) to the surface of the fiber sheet 1 disposed on the conveyor belt to manufacture the gel sheet 20 in which the silica sol is gelated, and a collection roller 150 for winding the gel sheet 20, which is transferred up to the other side by the conveyor belt 120, in the form of the roll to collect the gel sheet 20.

As described above, the gel sheet manufacturing machine 100 transfers the fiber sheet 1 wound around the winding roller 110 from the one side to the other side through the conveyor belt 120 when the fiber sheet 1 is prepared on the winding roller 110. Here, the silica sol supply member 130 injects the silica sol 2 manufactured in the step (a) to the surface of the fiber sheet 1 transferred by the conveyor belt 120 to impregnate the silica sol. Also, the catalyst supply member 140 injects the gelling catalyst 3 to the surface of the fiber sheet 1 in which the silica sol is impregnated to manufacture the gel sheet 20 in which the sol is gelated. Also, the gel sheet 20 transferred up to the other side of the conveyor belt 120 is rewound and collected by the collection roller 150.

Here, a scraper 160 for uniformly adjusting thickness of each of the silica sol 2 and the gelling catalyst 3, which are injected to the fiber sheet 1, may be provided on the conveyor belt 120. That is, the scraper 160 comprises a first scraper 161 for adjusting a thickness of the silica sol 2 injected to the surface of the fiber sheet 1 and a second scraper 162 for adjusting a thickness of the gelling catalyst 3 injected to the surface of the fiber sheet 1.

That is, the first scraper 161 and the second scraper 162 may have the same shape and be installed to be adjustable in height on a top surface of the conveyor belt 120 to uniformly adjust the thickness of each of the silica sol 20 and the gelling catalyst 3, thereby obtaining the gel sheet 20 having uniform quality.

Hereinafter, the silica sol injection step (c) and the gelling catalyst injection step (d) using the gel sheet manufacturing machine 100 will be described in detail.

(c) Silica Sol Injection Step

In the silica sol injection step (c), the silica sol 2 manufactured in the step (a) is injected and impregnated to the surface of the fiber sheet 1. That is, the silica sol 2 manufactured in the step (a) is injected into and stored in the silica sol supply member 130. Then, when the fiber sheet 1 is transferred up to a lower side of the silica sol supply member 130 by the conveyor belt 120, the silica sol 2 is injected through the silica sol supply member 130 and impregnated into the surface of the fiber sheet 1.

Here, the silica sol 2 injected to the fiber sheet 1 has a uniform thickness while passing through the first scraper 161 installed on the conveyor belt 120. That is, the first scraper 161 may uniformly adjust the thickness of the silica sol 2 by blocking the silica sol 2 having a predetermined thickness or more so that the silica sol 20 does not pass therethrough.

(d) Gelling Catalyst Injection Step

In the gelling catalyst injection step (d), the gelling catalyst 3 is injected to the surface of the fiber sheet 1 in which the silica sol 2 is impregnated in the step (c) to gelate the silica sol 2. That is, the gelling catalyst 3 manufactured in the step (b) is injected and stored in the catalyst supply member 140. Then, when the fiber sheet 1 is transferred up to the lower side of the catalyst supply member 140 by the conveyor belt 120, the gelling catalyst 3 is injected to the surface of the fiber sheet 1 through the catalyst supply member 140 to gelate the silica sol, thereby obtaining the gel sheet 20 in which the silica sol is gelated.

Here, the catalyst supply member 140 may inject the stored gelling catalyst 3 at a preset rate and then leave the gelling catalyst 3 for a preset time to stably gelate the silica sol. That is, the catalyst supply member 140 may inject the gelling catalyst 3 to the surface of the fiber sheet 1 at a rate of 0.035 L/min to 0.012 L/min and then leave the gelling catalyst 30 for 8 minutes to 12 minutes to gradually gelate the silica sol.

Particularly, the catalyst supply member 140 may uniformly adjust the gelation of the silica sol by varying in injection rate of the gelling catalyst 3 according to density of the silica sol 2 impregnated in the fiber sheet 1.

That is, (1) when the silica sol has a density of 40 kg/m$^3$, the injection rate of the gelling catalyst 3 is controlled to 0.035 L/min. Here, the silica sol 2 impregnated in the fiber sheet 1 has a content of 30 wt % and thermal conductivity of 14.9 mW/mK.

(2) When the silica sol has a density of 60 kg/m$^3$, the injection rate of the gelling catalyst 3 is controlled to 0.017 L/min. Here, the silica sol 2 impregnated in the fiber sheet 1 has a content of 38 wt % and thermal conductivity of 14.1 mW/mK.

(2) When the silica sol has a density of 80 kg/m$^3$, the injection rate of the gelling catalyst 3 is controlled to 0.014 L/min. Here, the silica sol 2 impregnated in the fiber sheet 1 has a content of 38 wt % and thermal conductivity of 13.6 mW/mK.

(2) When the silica sol has a density of 100 kg/m$^3$, the injection rate of the gelling catalyst 3 is controlled to 0.012 L/min. Here, the silica sol 2 impregnated in the fiber sheet 1 has a content of 55 wt % and thermal conductivity of 13.0 mW/mK.

As described above, the more the intensity of the silica sol increases, the more the injection rate of the gelling catalyst decreases to induce stable gelation of the silica sol.

The gel sheet 20 manufactured as described above is wound in the form of a roll by the collection roller 150 and then is collected. The collected gel sheet 20 undergoes the gel sheet aging step (e), the gel sheet surface modifying step (f), and the gel sheet drying step (g) to manufacture the aerogel sheet 30.

Reaction Vessel

Figure 4:
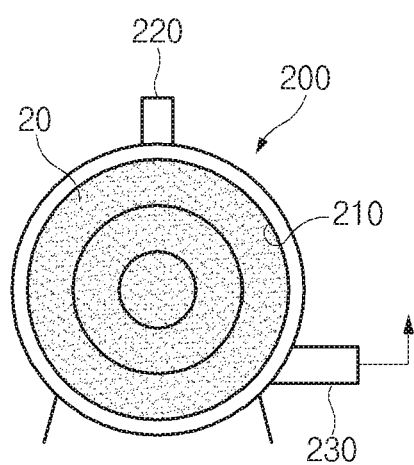
FIG. 4 is a view illustrating an aging step using a reaction vessel according to the first embodiment of the present invention.
Figure 5:
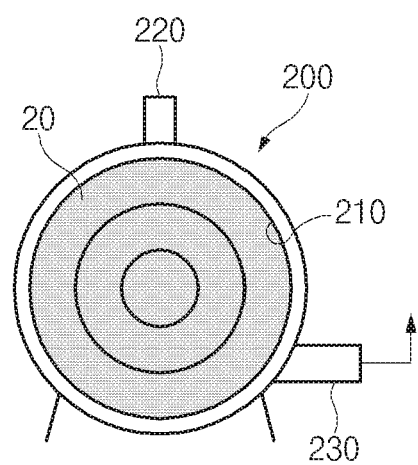
FIG. 5 is a view illustrating a surface modifying step using the reaction vessel according to the first embodiment of the present invention.
Figure 6:
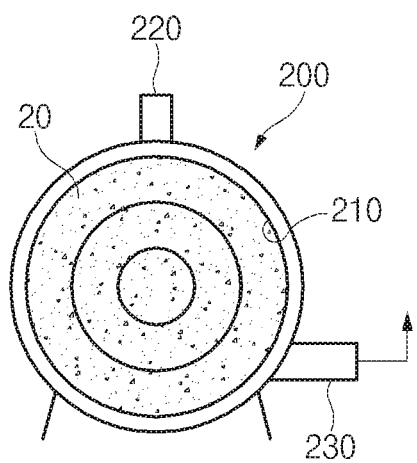
FIG. 6 is a view illustrating a drying step using the reaction vessel according to the first embodiment of the present invention.

As illustrated in FIGS. 4 to 6, the reaction vessel 200 has an accommodation space 210 in which the gel sheet 20 collected in the form of the roll is accommodated. Also, the reaction vessel 200 has one end in which an injection hole 220 connected to the accommodation space 210 is formed and the other end in which a discharge hole 230 connected to the accommodation space 210 is formed.

Hereinafter, the gel sheet aging step (e), the gel sheet surface modifying step (f), and the gel sheet drying step (g) using the reaction vessel 200 will be described.

(e) Gel Sheet Aging Step

As illustrated in FIG. 4, in the gel sheet aging step (e), the gel sheet 20 is aged. That is, the gel sheet 20 collected in the step (d) is accommodated into the accommodation space 210 of the reaction vessel 200. Then, the gel sheet 20 is aged for 50 minutes in a state in which the accommodation space 210 of the reaction vessel 200 is heated at 70° C. to uniformize tissues of the gel sheet 20.

Here, in the gel sheet aging step (e), the gel sheet 20 is left at room temperature (or a temperature of 25° C.) for 10 minutes before being aged in the reaction vessel 200 to perform the aging. That is, the aging may be performed after inducing the stable gelation of the silica sol 2 to more uniformize the tissues of the gel sheet 20.

(f) Gel Sheet Surface Modifying Step

As illustrated in FIG. 5, in the gel sheet surface modifying step (f), a coating solution is injected to the aged gel sheet 20 to modify a surface of the gel sheet 20. That is, in the gel sheet surface modifying step (f), ethanol and ammonia water (NH$_4$OH) are mixed to manufacture the coating solution. Then, the coating solution is injected into the accommodation space 210 through the injection hole 220 of the reaction vessel 200 in which the gel sheet 20 is inserted to modify the surface of the gel sheet 20. Here, the coating solution is injected 1.6 times of the silica sol impregnated into the surface of the fiber sheet in the step (c), and the aging is performed at a high temperature of 70° C. for one hour in the reaction vessel 200 to modify the surface of the gel sheet 20 by using hexamethyldisilazane (HMDS).

Also, the hexamethyldisilazane (HMDS) may be used for changing the surface of the gel sheet 20 into the surface having hydrophobicity.

(g) Gel Sheet Drying Step

As illustrated in FIG. 6, in the gel sheet drying step (e), the gel sheet 20 of which the surface is modified is dried to complete an aerogel sheet 30. Here, in the gel sheet drying step (g), supercritical drying is performed in a state in which the gel sheet 20 is accommodated in the reaction vessel 200. That is, the gel sheet drying step (g) comprises a first drying step of injecting carbon dioxide at a rate of 70 L/min for ten minutes under environments of a temperature of 28° C. and a pressure of 70 bar to dry the gel sheet 20, a second drying step of raising to a temperature of 50° C. for 1 hour and 20 minutes to dry the gel sheet 20, a third drying step of injecting carbon dioxide at a rate of 0.7 L/min for 20 minutes again under a temperature of 50° C. and a pressure of 150 bar to dry the gel sheet 20, and a fourth drying step of injecting carbon dioxide at a rate of 0.7 L/min for 20 minutes after breaking for 20 minutes to dry the gel sheet 20. The above-described drying steps may be performed to increase a drying rate of the gel sheet 20.

In the third drying step of the gel sheet drying step (g), ethanol is generated in the reaction vessel 200 by chemical reaction between the carbon dioxide and the gel sheet 20, and the ethanol generated in the reaction vessel 200 is discharged through the discharge hole 230 and then is collected.

Also, the gel sheet drying step (g) comprises a discharging step of discharging the carbon dioxide for 2 hours after the fourth drying step. Thus, a gradual environmental change in the gel sheet 20 is induced to uniformize the tissues of the gel sheet 20.

As described above, when the aerogel sheet 30 is completely manufactured, the aerogel sheet 30 is laminated on each of both the surfaces of the fiber sheet 10 to complete the process. Also, the aerogel sheet 30 and the fiber sheet which are laminated, are bonded to each other to manufacture the composite sheet 40.

[Method for Manufacturing Composite Sheet]

In the composite sheet manufacturing method (S30), heat and a pressure are applied to the aerogel sheet 30, the fiber sheet 10, the aerogel sheet 30, which are laminated, to bond the sheets to each other, thereby manufacturing the composite sheet 40. Here, a composite sheet manufacturing machine is used.

Composite Sheet Manufacturing Machine

As illustrated in FIG. 7, a composite sheet manufacturing machine according to the first embodiment of the present invention comprises a plurality of aerogel sheet supply rollers 310 supplying the aerogel sheet 30, a fiber sheet supply roller 320 supplying the fiber sheet 10 so that the fiber sheet 10 is disposed between the aerogel sheets 30, and a hot press 330 pressing the aerogel sheet 30 and the fiber sheet 10 while applying heat and a pressure in the state in which the fiber sheet 10 is disposed between the aerogel sheets 30 to manufacture a composite sheet 40. Here, the aerogel sheet 30 and the fiber sheet 10 may pass through the hot press 330 to manufacture the composite sheet 40.

Here, the composite sheet manufacturing machine 300 according to the first embodiment of the present invention further comprises a drying member 340 for drying the aerogel sheet 30 supplied from the aerogel sheet supply roller 310. The drying member 340 more increases a drying rate of the aerogel sheet 30 to improve the bondability with the fiber sheet 10.

Also, the composite sheet manufacturing machine 300 according to the first embodiment of the present invention further comprises a needling member 350 for performing needling on the aerogel sheets 30 with the fiber sheet 10 therebetween to temporarily bond the aerogel sheets to the fiber sheet 10. The needling member 350 temporarily bonds the aerogel sheets to the fiber sheet 10 to previously prevent irregular bonding from occurring.

The composite sheet manufacturing machine 300 according to the first embodiment of the present invention further comprises a cutting member 360 for cutting the composite sheet 40 to a predetermined size to process the composite sheet 40 into a composite pad 50. The cutting member 360 cuts the composite sheet 40 to form the composite pad 50 so as to improve efficiency in use and stage.

A composite sheet manufacturing step (S30) using the composite sheet manufacturing machine 300 comprising the above-described constituents according to the first embodiment of the present invention will be described.

Composite Sheet Manufacturing Step

When the aerogel sheet 30, the fiber sheet 10, and the aerogel sheet 30 are completely laminated through the fiber sheet preparing step (S10) and the aerogel sheet laminating step (S20), heat and a pressure are applied to the aerogel sheet 30, the fiber sheet 10, the aerogel sheet 30, which are laminated, to bond the sheets to each other, thereby manufacturing the composite sheet 40.

Here, a step (S25) of drying the prepared aerogel sheet 30 is further performed between the step (S20) and the step (S30).

That is, in the drying step (S25), the aerogel sheet 30 is dried by the high-temperature heat through the drying member 340 to vaporize moisture. Thus, the drying rate of the aerogel sheet 30 may increase.

Also, a step (S26) of performing the needling on the aerogel sheet 30 and the fiber sheet 10, which are laminated, to temporarily the aerogel sheet 30 and the fiber sheet 10 is performed between the step (S20) and the step (S30).

That is, in the temporary fixing step (S26), the needling is performed on the aerogel sheet 30 and the fiber sheet 10, which are laminated, to temporarily fix the aerogel sheet 30 and the fiber sheet 10, thereby preventing the aerogel sheet 30 and the fiber sheet 10 from moving when the compressing is performed.

As described above, the drying step and the temporary fixing step may be further performed to obtain the composite sheet 40 having uniform quality.

Here, although the composite sheet 40, in which the aerogel sheet 30, the fiber sheet 10, and the aerogel sheet 30 are laminated, is described as one embodiment in the first embodiment of the present invention, a composite sheet 40 in which one or more aerogel sheets 30 and one or more fiber sheets 10 are laminated may be manufactured according to the application.

The composite sheet 40 manufactured as described above may be cut to a predetermined size to obtain a composite pad 50. That is, the composite sheet 40 may be cut to a predetermined size through the cutting member 360 to obtain the composite pad 50.

The apparatus and method for manufacturing the composite sheet comprising the aerogel gel, which is manufactured through the above-described constituents and method, may be utilized to obtain the composite sheet and the composite pad, which have the high bondability and durability and the low manufacturing costs, and particularly, having the stable thickness.

Hereinafter, in description of an electrode assembly according to a second embodiment of the present invention, constituents having the same configuration and function have been given with the same reference numeral in the drawings, and thus their duplicated descriptions will be omitted.

A method for manufacturing composite sheet according to a second embodiment of the present invention is the same the method for manufacturing the composite sheet according to the first embodiment except for an aerogel sheet laminating step (S20).

That is, referring to FIG. 1, a method for manufacturing a composite sheet according to a second embodiment of the present invention comprises a step (S10) of preparing a fiber sheet 10, a step (20) of laminating an aerogel sheet 30 on each of both surfaces of the fiber sheet a step (S30) of applying heat and a pressure to the aerogel sheet 30 and the fiber sheet 10, which are laminated, to bond the sheets to each other and thereby to manufacture a composite sheet 40 in which the aerogel sheet 30, the fiber sheet 10, the aerogel sheet 30 are laminated.

Figure 8:
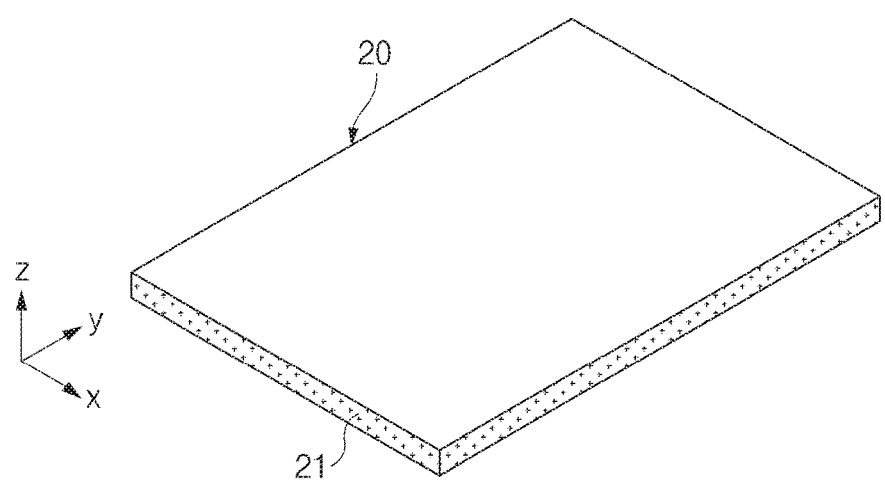
FIG. 8 is a view illustrating an aerogel compound in a composite sheet comprising an aerogel sheet according to a second embodiment of the present invention.

Here, as illustrated in FIG. 8, in the aerogel sheet laminating step (S20), the aerogel sheet 30 is manufactured by using a compound 20 comprising an aerogel matrix and a reinforcing structure 21.

The aerogel composite 20 comprises two reinforcing phases. The first phase is the aerogel matrix, and the second phase is the reinforcing phase. The reinforcing phase primarily comprises a lofty fibrous material, preferably, a mixture of lofty batting and one or more fibrous materials having significantly different thicknesses, lengths, or aspect ratios. The adequate mixture of a two fibrous material system is manufactured when a microfiber (one fibrous material) having a short and high aspect ratio is dispersed throughout a continuous aerogel matrix that penetrates into a lofty fiber batting (the other fibrous material).

Also, the aerogel matrix is continuous through the reinforcing structure 21, and the reinforcing structure 21 is the lofty fibrous batting. Here, the fibers are oriented along all three axes. The lofty fibrous batting has the form of a sheet, and the compound 20 is a lightweight insulation product having resilience and durability. The lofty fibrous batting is compressible by at least 50% of its natural thickness and returns to at least 70% of its original thickness after being compressed for 5 seconds. The lofty fibrous batting may have a density of 0.001 g/cm$^3$ to 0.26 g/cm$^3$, and the fibers discriminable in the cross-sectional area of the compound 20 may have a cross-sectional area less than 10% of the total cross-sectional area.

That is, the aerogel matrix may be an organic aerogel, inorganic aerogel, or a mixture thereof.

The organic aerogel may be selected form the group consisting of polyacrylates, polystyrenes, polyacrylonitriles, polyurethanes, polyimides, polyfurfural alcohol, phenol furfuryl alcohol, melamine formaldehydes, resorcinol formaldehydes, cresol formaldehyde, phenol formaldehyde, polyvinyl alcohol dialdehyde, polycyanurates, polyacrylamides, various epoxies, agar, agarose, and the like (see for instance C. S. Ashley, C. J. Brinker and D. M. Smith, Journal of Non-Crystalline Solids, volume 285, 2001).

Also, a principal synthetic route for the production of the inorganic aerogel is hydrolysis and condensation of an appropriate metal alkoxide. The most suitable metal alkoxides are materials having about 1 carbon atoms to 6 carbon atoms, preferably, from 1 carbon atoms to 4 carbon atoms in each alkyl group. Specific examples of such compounds comprise tetraethoxysilane (TEOS), tetramethoxysilane (TMOS), tetra-n-propoxysilane, aluminum isopropoxide, aluminum sec-butoxide, cerium isopropoxide, hafnium tert-butoxide, magnesium aluminum isopropoxide, yttrium isopropoxide, titanium isopropoxide, zirconium isopropoxide, and the like. In case of silica precursors, the materials may be partially hydrolyzed and stabilized at a low pH as polymers of polysilicic acid esters, for example, polydiethoxysiloxane (PDEOS). The materials are commercially available in alcohol solution (for example Silbond® 40, 40% silica content, Silbond Corporation). Pre-polymerized silica precursors are especially preferred for the aerogel compound of this invention.

Suitable materials for use in producing the aerogel to be used at a low temperature are non-refractory metal alkoxides based on oxide-forming metals. Suitable such metals are silicon and magnesium, and a mixture thereof. Suitable alkoxides that are adequate for high temperature are refractory metal alkoxides that are capable of forming oxides, e.g., such as zirconia, yttria, hafnia, alumina, titania, ceria, and the like, and a mixture thereof such as zirconia and yttria. Mixtures of non-refractory metals with refractory metals, such as silicon and/or magnesium with aluminum, may also be used. An advantage of using more than one metal oxide matrix material for the aerogel structure is an enhancement of IR opacification, which is achieved by providing chemical functional groups that absorb radiation at a wider range of wavelengths.

Finely dispersed dopants, for example, carbon black, titania, iron oxides, silicon carbide, molybdenum silicide, manganese oxides, polydialkylsiloxanes (where the alkyl groups contain 1 to 4 carbon atoms), and the like, may be added to improve thermal performance at a higher temperature by increasing the opacity of the article to IR transmission. A suitable amount of dopants generally ranges from about 1% to 20% by weight of the final compound, preferably, about 2% to 10%.

The lofty fibrous batting is defined as a fibrous material that shows the properties of bulk and some resilience (with or without full bulk recovery). The adequate form is a soft web of this material. The use of the lofty batting reinforcement material minimizes a volume of unsupported aerogel while avoiding substantial degradation of the thermal performance of the aerogel. The batting preferably refers to layers or sheets of a fibrous material, which is commonly used for lining quilts or for stuffing or packaging or as a blanket of thermal insulation.

The reinforcing fibrous material used in the second embodiment of the present invention is one or more layers of the lofty fibrous batting. The use of the lofty batting reinforcement material minimizes a volume of unsupported aerogel while avoiding substantial degradation of the thermal performance of the aerogel.

While generally the "batting" is a product resulting from carding or Garnetting fibers to form the soft web of a fiber in the form of a sheet, for purposes of this invention, the "batting" also comprises webs in non-sheet form which is provided that they are sufficiently open to be "lofty", e.g. the Primaloft® products from Albany International. In general, the batting refers to layers or sheets of a fibrous material, which is commonly used for lining quilts or for stuffing or packaging or as a blanket of thermal insulation. Suitable fibers for producing the batting are relatively fine and have deniers of 15 and below, preferably 10 and below. The softness of the web is a byproduct of the relatively fine, multi-directionally oriented fibers that are used to make the fiber web.

In the second embodiment of the present invention, the batting is the "lofty" if it contains sufficiently few individual filaments (or fibers) that it does not significantly alter the thermal properties of the reinforced compound 20 as compared to a non-reinforced aerogel body of the same material. This means that upon looking at a cross-section of the final aerogel compound 20, the cross-sectional area of the fibers is less than 10% of the total surface area of that cross-section, preferably less than 8%, and most preferably less than 5%. The lofty batting preferably has thermal conductivity of 50 mW/m-K, or less at room temperature and pressure to facilitate the formation of low thermal conductivity aerogel compound 20.

In the second embodiment of the present invention, another method for determining whether the batting is sufficiently lofty to be within the scope of this invention is to evaluate its compressibility and resilience. In this case, the lofty batting is one that (i) is compressible by at least 50% of its natural thickness, preferably at least 65%, and most preferably at least 80%, and (ii) is sufficiently resilient that after compression for several seconds it will return to at least 70% of its original thickness, preferably at least 75%, and most preferably at least 80%. By this definition, in case of the compression, the lofty batting may be recovered to substantially its original size and shape when the air (bulk) is removed. For example, a Holofil™ batting may be compressed from its original 1.5" thickness to a minimum of about 0.2" and recovered to its original thickness when a load is removed. This batting may be considered to contain 1.3" of air (bulk) and 0.2" of fiber. It is compressible by 87% and recovered to essentially 100% of its original thickness. Fiber glass batting used for home insulation may be compressed to a similar extent and recovered to about 80% of its original thickness, but does that quite slowly.

The batting used in the second embodiment of the present invention is substantially different from a fibrous mat. The fibrous mat is "a densely woven or thickly tangled mass," dense and relatively stiff fibrous structures with a minimal open space between adjacent fibers. While the mat has a density of 25 lbs/ft3 (0.41 g/cc), the lofty batting used in this invention has a much lower density, i.e., ranges from 0.1 lbs/ft3 to 16 lbs/ft3 (0.001 g/cc to 0.26 g/cc), preferably, 2.4 lbs/ft3 to 6.1 lbs/ft3 (0.04 to 0.1 g/cc). Generally, the mat is compressible by less than about 20% and shows little to no resilience. In an aerogel compound 20 prepared with the mat reinforcing material, the cross-sectional surface area of the mat fibers is about 30 to 50% of the total surface area in the cross-section.

Preferably, the batting is maintained to a thickness of at least 50% after the gel forming liquid is poured.

Referring to FIG. 8, a method of understanding the need for openness in the fiber reinforcing material used herein is to recognize that fiber reinforcements that tend to run along the z axis, (in the direction of the heat flow) will significantly increase the thermal conductivity of the resulting compound by acting as thermal conduits.

Particularly, the batting that has highly aligned (straight) fibers in the x-y horizontal plane is stiffer than the typical lofty batting of the same density with bent or crimped fibers running in all three axes. In order to minimize a heat flow in the z direction (as is the desire with most insulating materials) the batting should have low heat flow along the z axis (in the direction of the heat flow).

Thus, the suitable batting has high enough quantity of fibers oriented along the z axis to maintain loft, but not so great a quantity that the insulating properties of the resulting compound are compromised by these fibers. The fibers along the z axis may be of a different material (preferably, a material with lower thermal conductivity) than those in the x and y axes. The z axis fibers may also be made more circuitous, so that the z axis fibers present a more tortuous path for heat conduction than do the fibers in the x-y direction. The same fiber materials and methods may be used throughout the batting in an attempt to minimize thermal conduction in all axes, but in many insulating applications, however, it is heat flow in a specific direction that is being addressed, and using such materials and methods may compromise the flexibility of the resulting compound. The ideal lofty batting is one with fine, crimped fibers, which are uniformly dispersed throughout the compound 20.

Accordingly, the scope of the present invention is defined by the appended claims rather than the foregoing description and the exemplary embodiments described therein. Various modifications made within the meaning of an equivalent of the claims of the invention and within the claims are to be regarded to be in the scope of the present invention.

The invention claimed is:

1. A method for manufacturing a composite sheet comprising an aerogel sheet, the method comprising:
    a step (S10) of preparing a fiber sheet (10);
    a step (S20) of laminating the aerogel sheet (30) on each of both surfaces of the fiber sheet (10), wherein the step (S20) comprises:
        a step (a) of manufacturing a silica sol (2);
        a step (b) of manufacturing a gelling catalyst;
        a step (c) of injecting the silica sol (2), which is manufactured in the step (a), to a surface of the fiber sheet (1) to impregnate with the silica sol (2);
        a step (d) of injecting the gelling catalyst (3), which is manufactured in step (b), to the surface of the fiber sheet (1), into which the silica sol (2) is impregnated, to manufacture a gel sheet (20) in which the silica sol is impregnated;
        a step (e) of aging the gel sheet (20) in which the silica sol is gelated;
        a step (f) of applying a coating solution to the aged gel sheet (20) to modify a surface of the gel sheet (20); and
        a step (g) of drying the gel sheet (20) of which the surface is modified to manufacture the aerogel sheet (30); and
    a step (S30) of applying heat and a pressure to the aerogel sheet (30) and the fiber sheet (10), which are laminated, to bond the sheets to each other and to manufacture the composite sheet (40) in which the aerogel sheet (30), the fiber sheet (10), the aerogel sheet (30) are laminated.

2. The method of claim 1, further comprising a step (S26) of performing needling on the aerogel sheet (30) and the fiber sheet (10), which are laminated, to temporarily fix the aerogel sheet (30) and the fiber sheet (10) between the step (S20) and the step (S30).

3. The method of claim 1, further comprising a step (S40) of cutting the composite sheet (40) to a predetermined size to manufacture a composite pad (50) after the step (S30).

4. The method of claim 1, wherein, in the step (a), tetraethyl orthosilicate (TEOS) and ethanol are mixed to manufacture the silica sol (2).

5. The method of claim 4, wherein the tetraethyl orthosilicate (TEOS) comprises hydrolyzed TEOS.

6. The method of claim 1, wherein, in the step (b), ethanol and ammonia water ($NH_4OH$) are mixed to manufacture the gelling catalyst (3).

7. The method of claim 1, wherein the step (c) and the step (d) are performed within a conveyor belt that transfers the fiber sheet (1) from one side to the other side thereof.

8. The method of claim 1, wherein, in the step (d), the gelling catalyst (3) is injected to the surface of the fiber sheet (1) at a rate of 0.035 L/min to 0.012 L/min to leave the gelling catalyst (3) for 8 minutes to 12 minutes and thereby to gelate the silica sol.

9. The method of claim 1, wherein, in the step (e), the gel sheet (20), in which the silica sol is gelated, is aged at a temperature of 70° C. and aged for 50 minutes.

10. The method of claim 1, wherein, in the step (f), the coating solution is manufactured by mixing ethanol with ammonia water ($NH_4OH$).

11. The method of claim 10, wherein, in the step (f), the coating solution is injected with 1.6 times of the silica sol (2) impregnated into the surface of the fiber sheet (1), and the aging is performed at a high temperature of 70° C. for one hour to modify the surface of the fiber sheet (10) by using hexamethyldisilazane (HMDS).

12. The method of claim 1, wherein the step (g) comprises a first drying step of injecting carbon dioxide at a rate of 70 L/min for ten minutes under environments of a temperature of 28° C. and a pressure of 70 bar to dry the gel sheet (20) of which the surface is modified, a second drying step of raising to a temperature of 50° C. for 1 hour and 20 minutes to dry the gel sheet (20), a third drying step of injecting carbon dioxide at a rate of 0.7 L/min for 20 minutes under a temperature of 50° C. and a pressure of 150 bar to dry the gel sheet (20), and a fourth drying step of injecting carbon dioxide at a rate of 0.7 L/min for 20 minutes after breaking for 20 minutes to dry the gel sheet (20).

13. The method of claim 12, wherein, in the third drying step of the step (g), the ethanol generated from the gel sheet (20) of which the surface is modified is collected while injecting the carbon dioxide.

14. The method of claim 12, wherein the step (g) further comprises a step of discharging the carbon dioxide for 2 hours after the fourth drying step.

15. A method for manufacturing a composite sheet comprising an aerogel sheet, the method comprising:
    preparing a fiber sheet (10);
    preparing an aerogel sheet (30) by a method comprising:
      injecting a silica sol (2) to a surface of a fiber sheet (1) to impregnate with the silica sol (2);
      injecting a gelling catalyst (3) to the surface of the fiber sheet (1), into which the silica sol (2) is impregnated, to manufacture a gel sheet (20);
    aging the gel sheet (20);
    applying a coating solution to a surface of the aged gel sheet (20) to modify the surface of the gel sheet (20); and
    drying the gel sheet (20) of which the surface is modified to yield the aerogel sheet (30);
    laminating the aerogel sheet (30) on each of both surfaces of the fiber sheet (10); and
    applying heat and a pressure to the aerogel sheet (30) and the fiber sheet (10), which are laminated, to bond the sheets to each other and to manufacture the composite sheet (40) in which the aerogel sheet (30), the fiber sheet (10), and the aerogel sheet (30) are laminated,
wherein:
the aerogel sheet (30) comprises a compound comprising an aerogel matrix and a reinforcing structure, and
in the compound the aerogel matrix is continuous through the reinforcing structure, and the reinforcing structure is a lofty fibrous batting, wherein the fibers are oriented along all three axes, the lofty fibrous batting has the form of a sheet, the compound is a lightweight insulation product having resilience and durability, the lofty fibrous batting is compressible by at least 50% of its natural thickness and returns to at least 70% of its original thickness after being compressed for 5 seconds, the lofty fibrous batting has a density of 0.001 g/cm$^3$ to 0.26 g/cm$^3$, and the fibers discriminable in a cross-sectional area of the compound has a cross-sectional area less than 10% of the total cross-sectional area.

* * * * *